(12) United States Patent
Russak et al.

(10) Patent No.: US 7,957,569 B2
(45) Date of Patent: Jun. 7, 2011

(54) ORIENTATION OF RADIOGRAPHIC IMAGES

(75) Inventors: Zeev Russak, RaAnana (IL); Zeev Glozman, Tel-Aviv (IL)

(73) Assignee: Orthocrat Ltd., Petach-Tikva (IL)

( * ) Notice: Subject to any disclaimer, the term of this patent is extended or adjusted under 35 U.S.C. 154(b) by 1093 days.

(21) Appl. No.: 11/519,910

(22) Filed: Sep. 13, 2006

(65) Prior Publication Data
US 2008/0063302 A1 Mar. 13, 2008

(51) Int. Cl.
*G06K 9/00* (2006.01)
*G06K 9/32* (2006.01)
*G01C 17/00* (2006.01)

(52) U.S. Cl. .......................... 382/128; 382/296; 702/150

(58) Field of Classification Search .................. 382/128, 382/129, 130, 131, 132, 133, 134, 173, 176, 382/289, 199, 216, 296; 378/41, 62, 162, 378/163, 205, 28; 600/414, 425, 427, 300, 600/411, 426; 250/390.02; 702/150
See application file for complete search history.

(56) References Cited

U.S. PATENT DOCUMENTS

| 3,069,654 | A |   | 12/1962 | Hough |
| 3,812,842 | A |   | 5/1974  | Rodriguez |
| 4,506,676 | A |   | 3/1985  | Duska |
| 4,870,694 | A |   | 9/1989  | Takeo |
| 5,394,457 | A |   | 2/1995  | Leibinger et al. |
| 5,469,847 | A | * | 11/1995 | Zinreich et al. ............... 600/414 |
| 5,506,918 | A |   | 4/1996  | Ishitani |
| 7,079,620 | B2 | * | 7/2006 | Vaillant et al. .................. 378/41 |
| 7,127,090 | B2 | * | 10/2006 | Kreang-Arekul et al. .... 382/128 |
| 7,480,363 | B2 | * | 1/2009 | Lasiuk et al. ................... 378/54 |
| 7,616,818 | B2 | * | 11/2009 | Dewaele ........................ 382/199 |
| 2004/0086082 | A1 |   | 5/2004 | Foos et al. |
| 2007/0260137 | A1 | * | 11/2007 | Sato et al. ..................... 600/407 |

OTHER PUBLICATIONS

Official Action Dated Oct. 27, 2009 From the US Patent and Trademark Office Re.: U.S. Appl. No. 11/519,909.
Atherton et al. "Size Invariant Circle Detection", Image and Vision Computing, 17: 795-803, 1999.
Betke et al. "Real-Time Multiple Vehicle Detection and Tracking From A Moving Vehicle", Machine Vision and Applications, 12: 69-83, 2000.
Lehmann et al. "Survey: Interpolation Methods in Medical Image Processing", IEEE Transactions on Medical Imaging, 18(11): 1049-1075, Nov. 1999.
Response Dated Apr. 27, 2010 to Official Action Dated Oct. 27, 2009 From the US Patent and Trademark Office Re.: U.S. Appl. No. 11/519,909.
Official Action Dated Jul. 22, 2010 From the US Patent and Trademark Office Re.: U.S. Appl. No. 11/519,909.
Atiquzzaman "Multiresolution Hough Transform—An Efficient Method of Detecting Patterns in Images", IEEE Tranactions on Pattern Analysis and Macine Intelligence, 14(11): 1090-1095, Nov. 1992.
Kimme et al. "Finding Circles by an Array of Accumulators", Communications of the ACM, 18(2): 120-122, Feb. 1975.

* cited by examiner

*Primary Examiner* — Abolfazl Tabatabai (57) ABSTRACT

An apparatus for determining orientation of an image, comprising: an image receiver, configured to receive the image, and an orientation determiner, associated with the image receiver and configured to automatically determine the orientation of the image, based on analysis of internal image information.

30 Claims, 12 Drawing Sheets

ORIENTATION OF RADIOGRAPHIC IMAGES

FIELD AND BACKGROUND OF THE INVENTION

The present invention relates to an automated method and system for image processing of images, and more specifically but not exclusively, to an automated method and system for automatic orientation of a radiographic image.

Radiographic images of anatomical regions are a routine and valuable diagnostic and research tool.

Such images are typically produced by placing an object, such as a portion of the human body, on a plate having a surface composed of excitable phosphors (a film). Next, the object and the film are exposed X-rays. As the radiation energy strikes the surface of the film, a portion of the energy is stored by the phosphor-containing film.

Upon subsequent stimulation by visible light or other stimuli, the film gives off light in direct proportion to the amount of energy stored therein. Areas of the film receiving unattenuated radiation absorb the most energy and thus produce the most light when subsequently stimulated. Areas in which lesser amounts of radiation energy are absorbed, due to the presence of the object (e.g., body region), produce a proportionately lesser amount light when subsequently stimulated.

The image may be displayed for viewing in one of several ways. For example, the stored energy of the film may be photoelectrically detected and converted into a signal. The signal is then further processed or used to reproduce the image on a photographic film, a CRT (Cathode Ray Tube) device, or similar device. With X-rays the film is usually chemically developed.

The positional orientation of the anatomical region of interest with respect to the film is of perhaps obvious critical importance to the image interpreter (e.g., radiologist), as well as for further processing of the image.

Most radiologists interpret films from light boxes. When the films are brought to the light boxes and placed by radiologists, technicians, secretaries, or other personnel, the films are expected to have a correct orientation to facilitate proper reading and interpretation.

Correct orientation takes on increased importance where radiologists compare the newly acquired film with one or more previous films of the anatomical region of interest.

Proper positional orientation of an image is also necessary for automated image enhancing and reading systems, which often assume an arbitrary positional orientation for any given image signal.

For example, where an image is viewed on a CRT or similar device the positional orientation is assumed to be parallel with the longitudinal direction of the rectangular phosphor surface on which the image was created (i.e., the neck portion of the image is aligned with the "top" of the film).

Accordingly, feeding an image signal oriented in any position other than parallel with the longitudinal direction of the phosphor surface produces errors in the display. Furthermore, feeding an image signal oriented in any position other than parallel with the longitudinal direction of the phosphor surface also prevents accurate further enhancement and/or processing of the image.

Due to the importance of the orientation of the image, many prior art attempts at detecting positional orientation of a radiographic image are known.

For example, one prior art method compares the sum of intensity values of the image signal of a horizontal strip of the subject film with the sum of the intensity values of the image signal of a vertical strip of the subject film.

The strips are taken from the subject film without differentiating the source of the intensity values within the strip (i.e., there is no way to tell if the intensity values are from the body region of interest, the background or the foreground).

Accordingly, if a portion of the foreground (which has very low intensity values) or background (which has very high intensity values) of the film is included in the strip, the calculations of distribution are skewed in one or both directions. In such instances, the ultimate determination of orientation lacks consistency and is thus unreliable.

Another prior art method utilizes a comparison of the characteristic values (sum of the intensity values and the average intensity value) for a horizontal strip of the film and for a vertical strip of the film. The method aims at ensuring that the strips pass through the central portion of the image. However, the method lacks any differentiation of the source of the image values used in the calculations. Thus, it is also impossible with this prior art method to determine whether, and by how much, the results are skewed by the inclusion of a portion of the background and/or foreground of the film. An additional problem associated with this prior art method is that the method assumes perfect alignment of the body region of interest on the film to ensure that the strips are taken through the central portion of the image. This assumption ignores the reality of actual image production.

Another prior art method is taught by U.S. Pat. No. 4,870, 694, to Takeo, filed on Mar. 24, 1988, entitled "Method of determining orientation of image". Takeo teaches determining orientation of an image of a human body by comparing distribution of the image signal level in the vertical direction of the image with the distribution of the image signal level in the horizontal direction. However, the Takeo method is computationally intensive.

U.S. Pat. No. 5,506,918, to Ishitani, filed on Dec. 23, 1992, entitled "Document skew detection/control system for printed document images containing a mixture of pure text lines and non-text portions", teaches a document skew detection apparatus.

The apparatus taught by Ishanti includes an image extraction section for extracting from the document image a local image region. The local image region contains pure text lines occupying an almost entire area thereof.

The Ishanti apparatus further includes a skew detection section, for detecting a direction of orientation of the text lines of the local region. The skew detection section also determines an angular difference between a detected direction and a reference direction as a skew angle of the printed document.

However, the Ishanti apparatus is suitable only for images which contain text.

There is thus a widely recognized need for, and it would be highly advantageous to have, a system devoid of the above limitations.

SUMMARY OF THE INVENTION

According to one aspect of the present invention there is provided an apparatus for determining orientation of an image comprising: a) an image receiver, configured to receive the image, and b) an orientation determiner, associated with the image receiver and configured to automatically determine an orientation of the image based on analysis of internal image information.

According to a second aspect of the present invention there is provided a method for determining orientation of an image comprising: a) receiving the image; and b) automatically determining an orientation of the image, based on analysis of internal image information.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention.

In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments comprise an apparatus and method for automatic orientation of an image.

Preferred embodiments of the present invention teach a method for automatically orienting an image such as a radiographic image.

The method includes detecting straight lines in the image. The orientation of the image is determined according to one or more of the detected lines. Preferably, the detection of the straight lines is carried out using Linear Hough Transformation applied on a digital image produced from an input X-Ray photograph, etc. The digital image may be produced using a scanner, or any other digitizing device, as known in the art.

The orientation may be determined according to the strongest among the lines (i.e. a line having the maximum number of edge points on the line). The orientation may also be determined through finding pairs of substantially similar slopes among the detected lines and determining the orientation of the image according to the strongest among the pairs (i.e. one or more pairs which have the maximum number of points, one or more pairs which include a line having the maximum number of points, etc).

Based on the determined orientation, the image may be rotated into a position where the image's orientation is modified to the nearest 90 degrees multiple orientation, to the nearest 180 degrees multiple orientation, or to any other position set in accordance with a user predefined policy, as described in further detail hereinbelow.

The principles and operation of a system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Figure 1A:
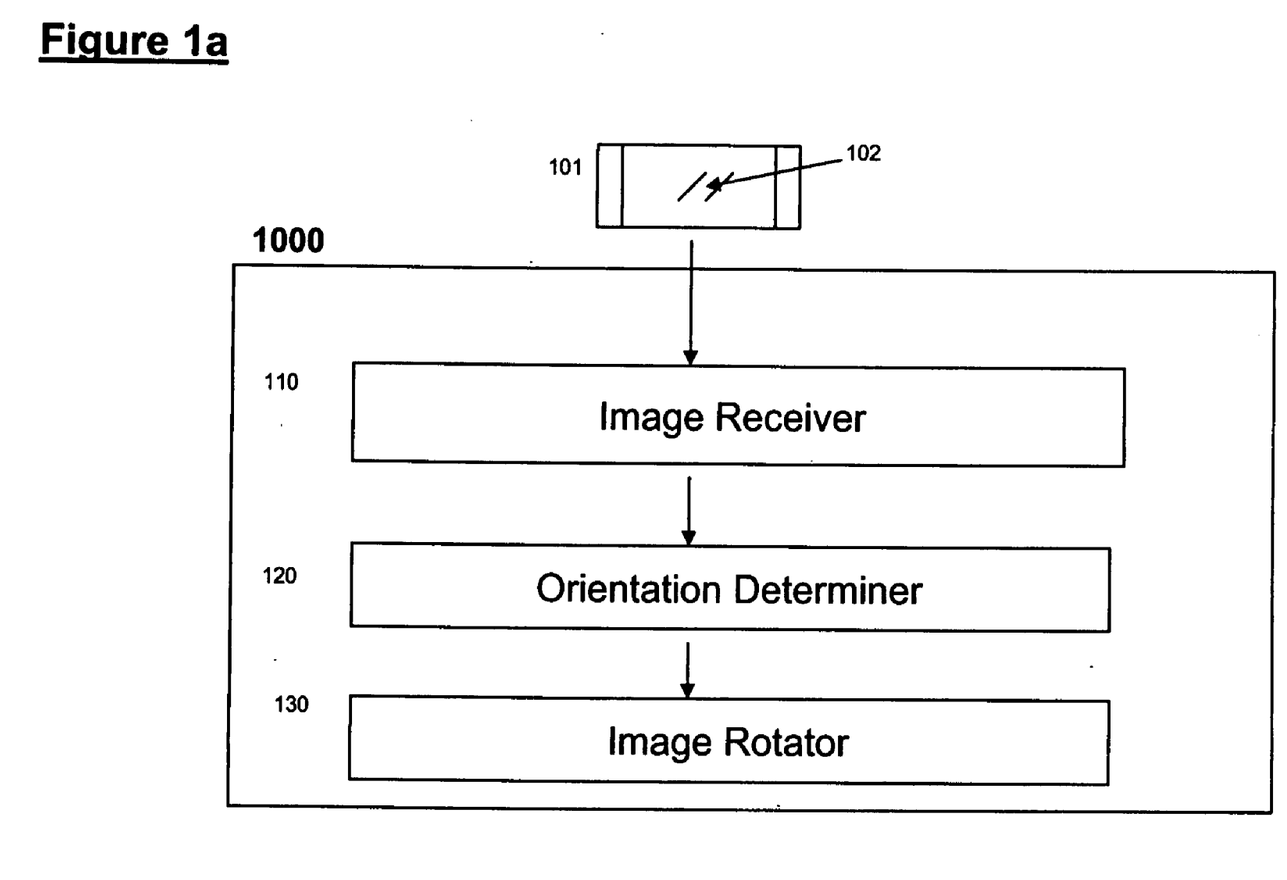
FIG. 1a is a simplified block diagram illustrating an apparatus for automatic determination of orientation of an image, according to a preferred embodiment of the present invention.

Reference is now made to FIG. 1a, which is simplified block diagram illustrating an apparatus for automatic determination of orientation of an image according to a preferred embodiment of the present invention.

Apparatus 1000 includes an image receiver 110, for receiving the image 101. For example, the image may be a grey scale digital image, such as a digital radiographic image of a patient's organ, as known in the art.

Preferably, the image receiver 110 is connected to a digitizing device, for digitizing the image. For example, the image receiver 110 may be connected to a scanner which may be used to scan a medical X-Ray picture on a photographic plate. The scanner generates a digital image bearing digital data representative of the X-Ray picture, and feeds the digital image to the image receiver 110.

The apparatus 1000 further includes an orientation determiner 120, connected with the image receiver 110.

The orientation determiner 120 automatically determines orientation of the image. Preferably, the orientation determiner 120 implements the methods described hereinbelow for determining the orientation of the image.

Preferably, apparatus 1000 also includes an image rotator 130, connected with the orientation determiner and configured to rotate the image, thereby to modify the orientation of the image, according to a predefined policy. That is to say, by rotating the image, the image rotator 130 modifies the orientation of the image from the determined orientation into an orientation compliant with a policy predefined by a user (or an administrator) of the apparatus 1000.

Figure 1B:
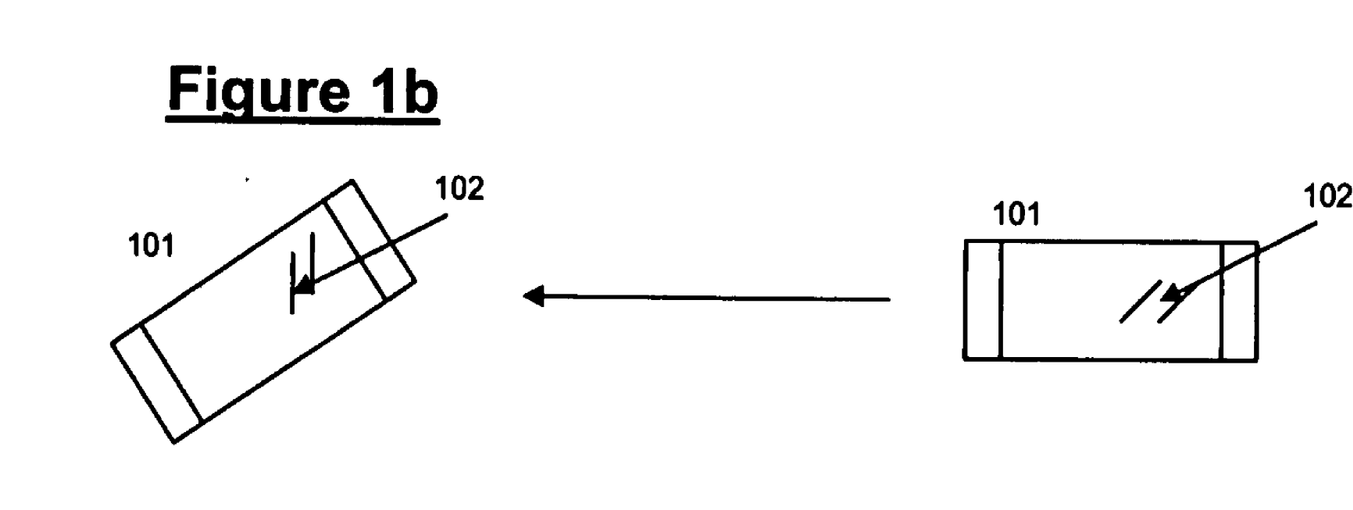
FIG. 1b is a simplified block diagram schematically illustrating an image rotated, according to a preferred embodiment of the present invention.

For example, a user may define that the FIG. 101 is to be rotated into the nearest position where linear edges 102 detected inside the image align in a 90 degrees multiple orientation, as illustrated in FIG. 1b.

Figure 1C:
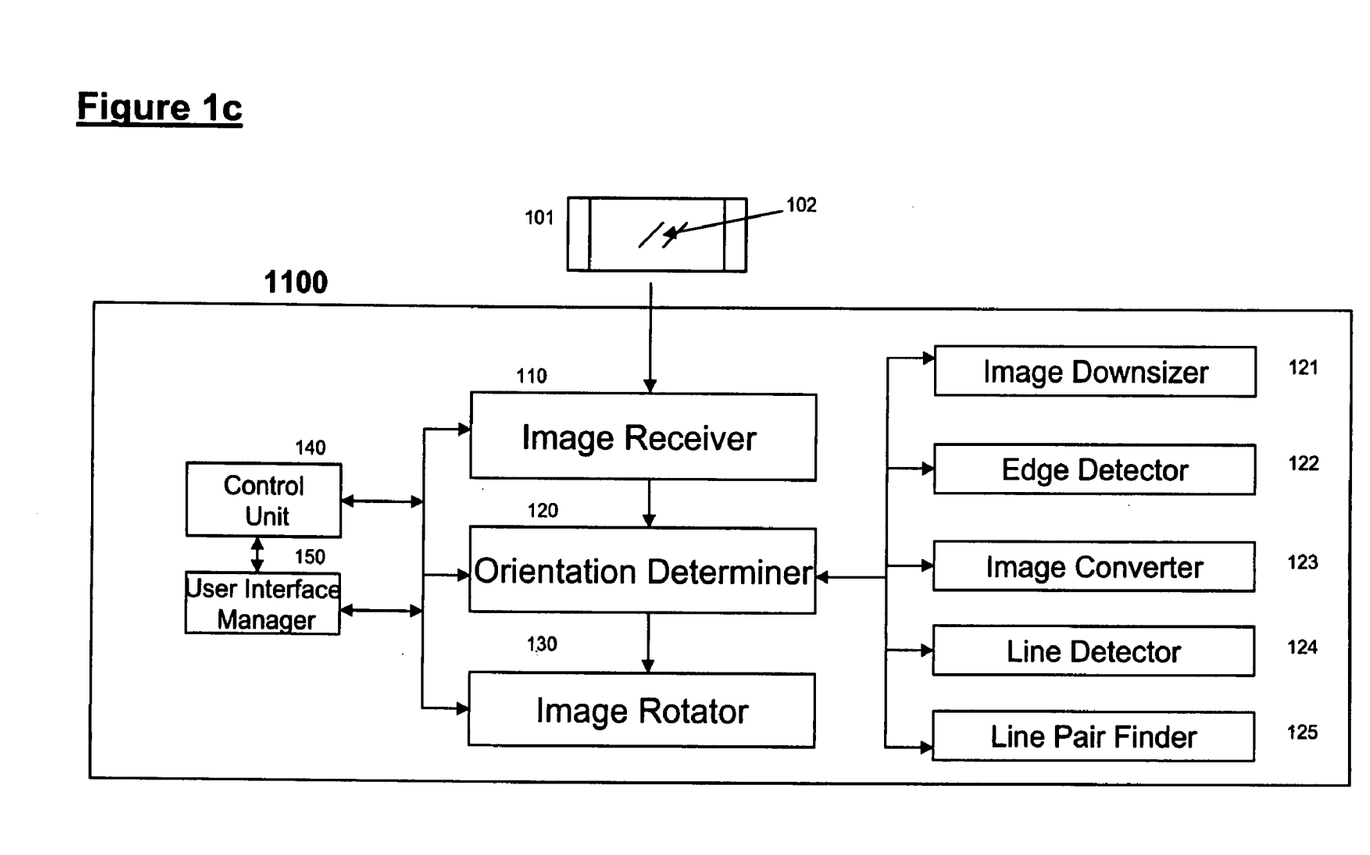
FIG. 1c is a detailed block diagram illustrating an apparatus for automatic orientation of an image, according to a preferred embodiment of the present invention

Reference is made to FIG. 1c, which is a detailed block diagram illustrating an apparatus for automatic orientation of an image, according to a preferred embodiment of the present invention.

Apparatus 1100 includes the image receiver 110, the orientation determiner 120, and the image rotator 130, described in further detail hereinabove.

Optionally, apparatus 1100 also includes an image downsizer 121 connected with the orientation determiner 120.

The image down-sizer 121 downsizes the original image into a downsized image having a smaller number of pixels than the original image, as described in further detail hereinbelow.

Optionally, the apparatus 1100 also includes an edge detector 122, for detecting edges in the image downsized using the image down-sizer 121, as described in further detail hereinbelow.

Optionally, apparatus 1100 also includes an image converter 123.

The image converter 123 converts the edge detected image into a binary image, by applying a predefined threshold on intensity of each pixel of the edge detected image. Preferably, the threshold is a quotient of a) intensity of the most intensive pixel of the edge detected image and b) an edge ratio predefined by a user, as described in further detail hereinbelow. Preferably, the edge ratio for X-Ray images is 7.44.

The apparatus 1100 may also include a line detector 124. The line detector 124 finds lines in the binary image.

Preferably, the line detector 124 applies Linear Hough Transformation on the binary image, as described in further detail hereinbelow.

Optionally, the orientation determiner 120 determines the orientation of the image according to a slope of one or more strongest ones of the found lines, as described in further detail hereinbelow.

Preferably, apparatus 1100 also includes a line pair finder 125, for finding pairs of substantially parallel lines among lines found by the line finder. More preferably, the orientation determiner 120 determines the orientation of the image according to an averaged slope calculated using slopes of strongest pair among the pairs, as described in greater detail hereinbelow.

Preferably, the apparatus 1100 further includes a control unit 140.

The control unit 140 may be used for controlling the automatic orientation, for defining parameters for methods implemented by the orientation determiner 120, or for defining policies implemented by the apparatus 1100, etc, as described in further detail hereinbelow.

Preferably, apparatus 1100 further includes a user interface manager 150.

The user interface manager 150 manages an interface for interacting with a user 190 of the apparatus 1100. Through the interface, the user may define the parameters for methods and policies implemented by the orientation determiner 120, and the user may be presented with the received image and the rotated image, etc.

Methods employed by the apparatus 1100 for automatic orientation of the received digital image are described in further detail herein below.

Figure 2:
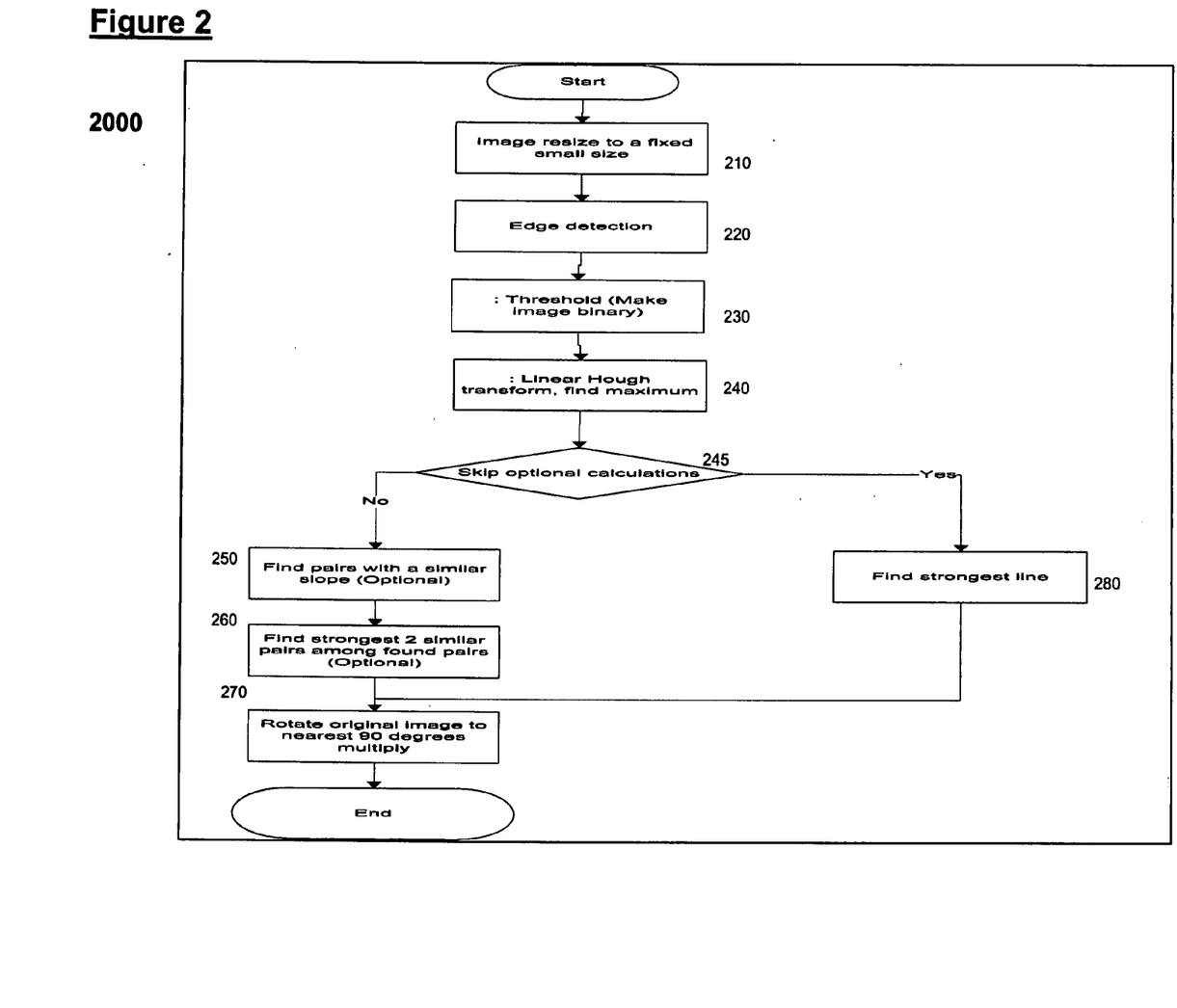
FIG. 2 is a simplified flowchart illustrating a method for automatic orientation of an image, according to a preferred embodiment of the present invention.

Reference is now made to FIG. 2, which is a simplified flowchart illustrating a method for automatic orientation of an image, according to a preferred embodiment of the present invention.

Figure 3:
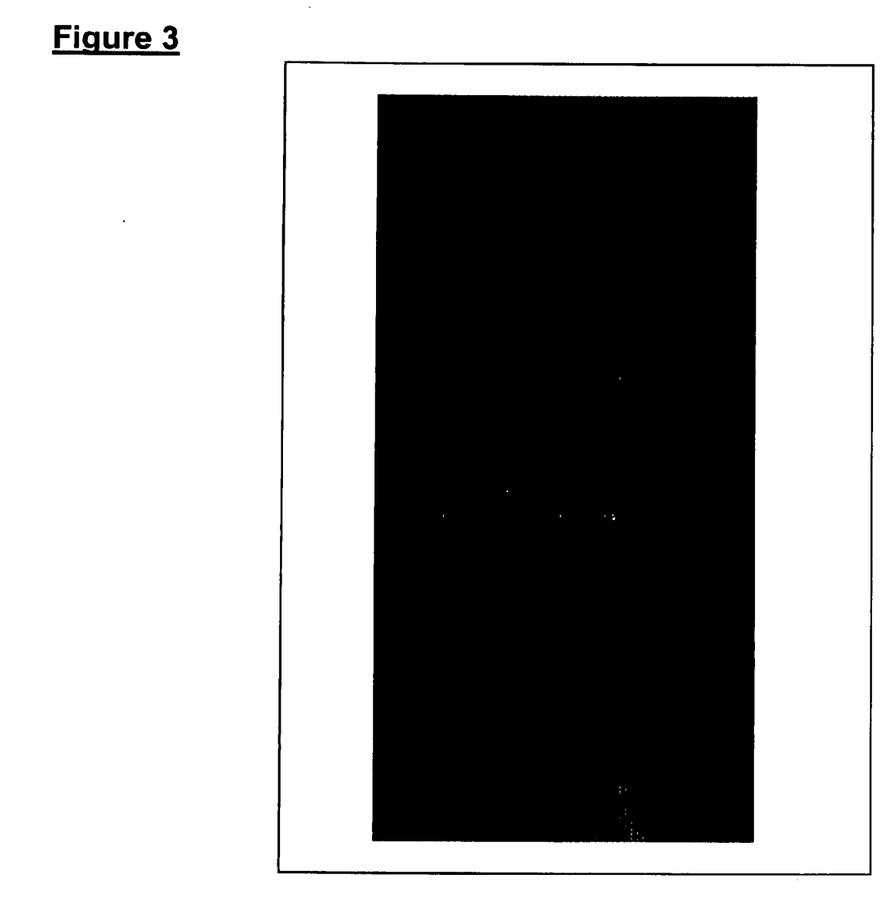
FIG. 3 shows an exemplary resized image according to a preferred embodiment of the present invention.

According to method 2000, a received image is resized 210 to a fixed small size; say using the image re-sizer 121 described hereinabove. Preferably, the image is resized using decimation to the smallest size that preserves enough details to preserve the image's main lines. An exemplary resized image having 128 pixels, in accordance with a preferred embodiment of the present invention is shown in FIG. 3.

Next, the image is edge detected 220, say using the edge detector 122 described hereinabove.

Preferably, the edge detector 122 detects edges in the image using the Sobel Edge Detection Method, or the Canny Edge Detection Method, or any other edge detection method, as known in the art.

The goal of edge detection is to mark the points in the image at which luminous intensity changes sharply. The sharp changes in the intensity usually reflect important events and changes in properties of the image. The changes include but are not limited to: discontinuities in depth, discontinuities in surface orientation, changes in material properties, and variations in illumination.

Edge detection of an image reduces significantly the amount of data and filters out information that may be regarded as less relevant, preserving the important structural properties of an image.

There are many methods for edge detection, but most of the edge detection methods can be grouped into two categories: search-based methods, and zero-crossing based methods.

The search-based methods detect edges by looking for maxima and minima in the first derivative of the image, usually local directional maxima of the gradient magnitude.

The zero-crossing based methods search for zero crossings in the second derivative of the image in order to find edges, usually the zero-crossings of the Laplacian or the zero-crossings of a non-linear differential expression, as known in the art.

Next, the edge detected image is converted 230 into a binary image, say using the image detector 123 described in further detail hereinabove.

Optionally, the edge detected image is converted 230 into a binary image, say by applying a predefined threshold on intensity of each pixel of the edge detected image.

Preferably, the threshold is a quotient of intensity of a most intensive pixel of the edge detected image and an edge ratio predefined by a user:

$$Threshold = \frac{MaxIntensivePixel}{EdgeRatioParameter}$$

The Edge Ratio Parameter may be input by a user or an administrator of an apparatus 1000, as described hereinabove. Preferably, an edge Ratio Parameter for an X-Ray image digital image may be set to 7.44.

In the Binary image, each pixel which is at least as intensive as the threshold is converted into a binary 1, and each pixel which is weaker than the threshold is converted into a binary 0.

Figure 4:
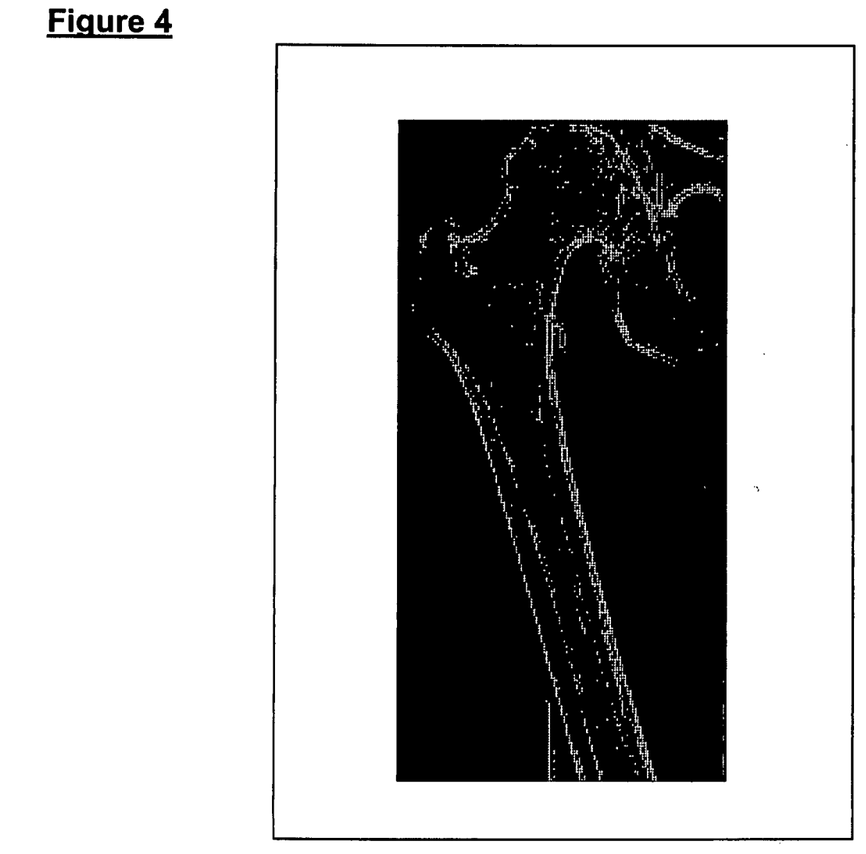
FIG. 4 shows an exemplary Binary Image, according to a preferred embodiment of the present invention.

An exemplary binary image, according to a preferred embodiment of the present invention is shown in FIG. 4.

Next, the binary image is searched for detecting 240 lines in the binary image; say using the line detector 124 described hereinabove.

Preferably, the line detector 124 performs Linear Hough Transformation on the binary image, for detecting the lines in the image.

Preferably, while the Linear Hough Transformation is performed on the image, the image boundaries that may cause an edge are ignored.

Hough Transformation is a technique known in the art, which was patented in U.S. Pat. No. 3,069,654, to Hough, filed on Dec. 18, 1962.

The underlying principle of the Hough Linear Transformation is that there are an infinite number of potential lines that pass through any point, each at a different orientation. The purpose of the transformation is to determine which of these theoretical lines pass through most features in the image—that is, which lines fit most closely to the data in the image.

In order to determine that two points lie on the same potential line, it is necessary to create a representation of a line that allows meaningful comparison in this context. In the standard Hough transformation, each line is represented by two parameters, which represent the length and angle from the origin of a normal to the line in.

For example, a line may be described in the resultant Hough transformed image as being at an angle $\theta$ of 90°, and being r units away from the origin of a coordinate system, according to a point of the line which is closest to the origin of the coordinate system.

By transforming all the possible lines through a point into this coordinate system—i.e. calculating the value of r for every possible value of $\theta$—a sinusoidal curve is created which is unique to that point. This representation of the two parameters is sometimes referred to as the Hough space.

If the curves corresponding to two points are superimposed, the location(s) (in Hough space) where they cross correspond to lines (in the original image space) which pass through both points. More generally, a set of points which form a straight line produces Hough transforms which cross at the parameters for that line.

Figure 5:
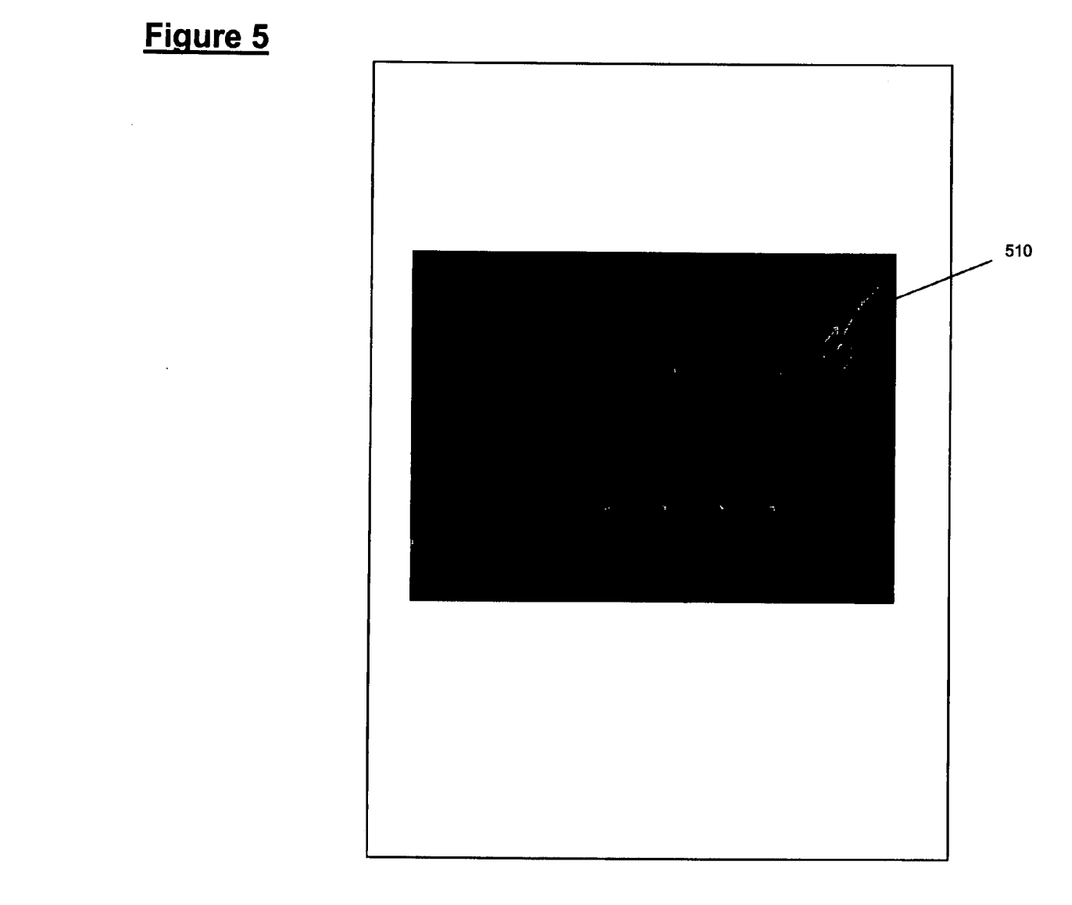
FIG. 5 shows an exemplary Hough Transformed Image, according to a preferred embodiment of the present invention.

FIG. 5 shows an exemplary Hough transformed image, according to a preferred embodiment of the present invention.

Preferably, the user of apparatus 1100 (described in further detail hereinabove) is allowed to choose between one of two criteria for determining the orientation of the image, say using the control unit 140 described hereinabove.

One criterion is the Strongest Line Criterion and the other criterion is the Strongest Pair Criterion. Based on the user made choice, one of the two criteria is selected 245 for determining the orientation of the image.

If the user selects the Strongest Line Criterion, there is found the strongest (most intensive) point in the Hough transformed image, as illustrated using point 510 in FIG. 5. Each point in the Hough transformed image corresponds with respective r and $\theta$ values, as explained in further detail hereinabove.

Figure 6:
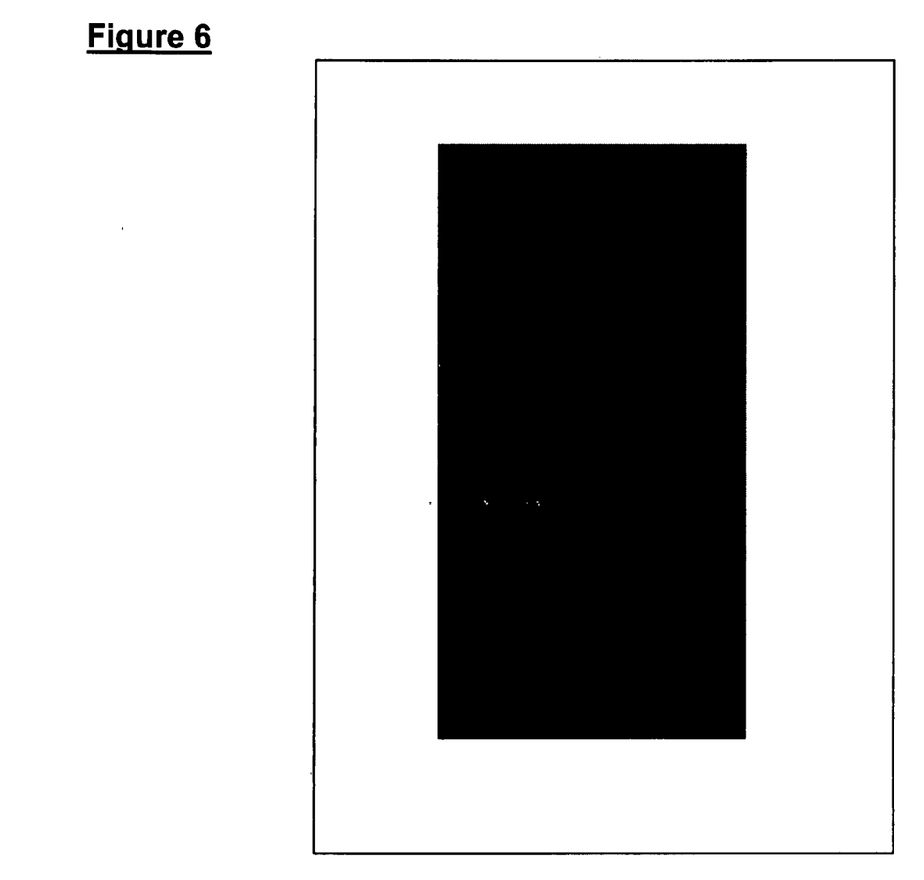
FIG. 6 shows an exemplary strongest image line, according to a preferred embodiment of the present invention.

The strongest point corresponds to a line that is likely to be a contour of the object of interest in the image, say of an organ or a long bone (such as the femur) in an X-Ray photograph, as illustrated in FIG. 6.

Next, the orientation of the image is determined according to the slope of the line likely to be a contour of the object of interest in the image.

If the user selects the Strongest Pair Criterion, there are found 250 a number (N) of strongest among the points of the Hough transformed image. Preferably, the number (N) is predetermined by the user, say using the control unit 140 described in further detail hereinabove.

Figure 7:
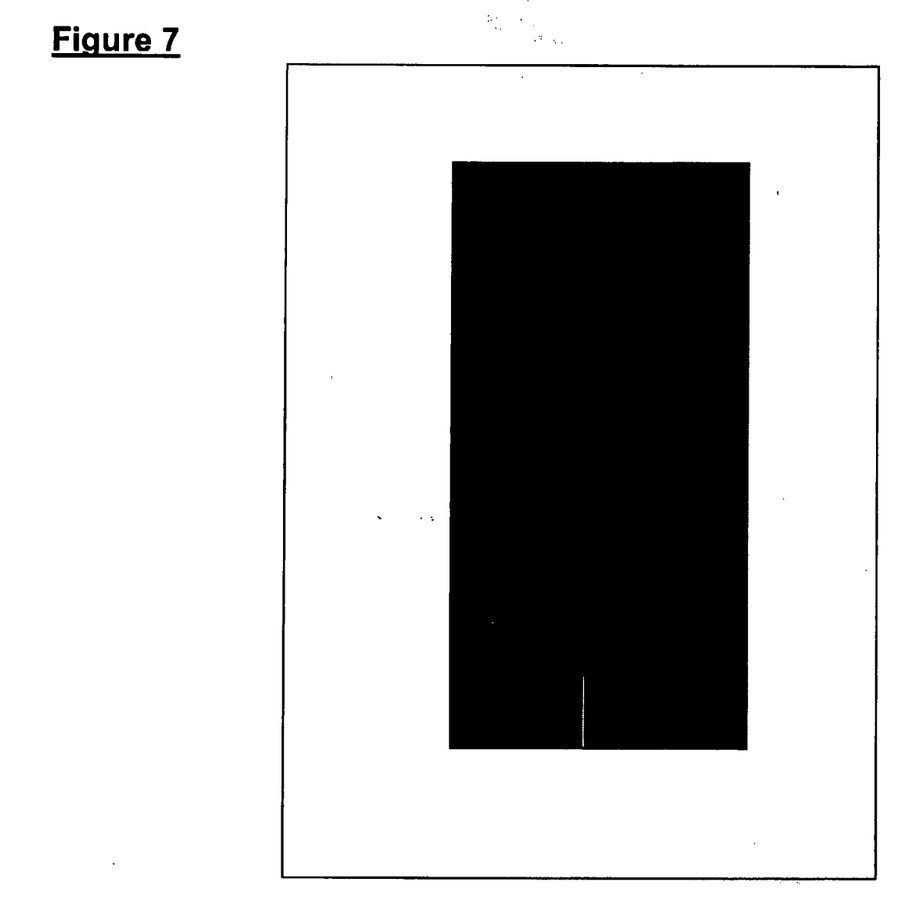
FIG. 7 shows an exemplary strongest image lines, according to a preferred embodiment of the present invention.

For example, FIG. 7 shows ten strongest lines of an input image, detected in accordance with a preferred embodiment of the present invention.

Figure 8:
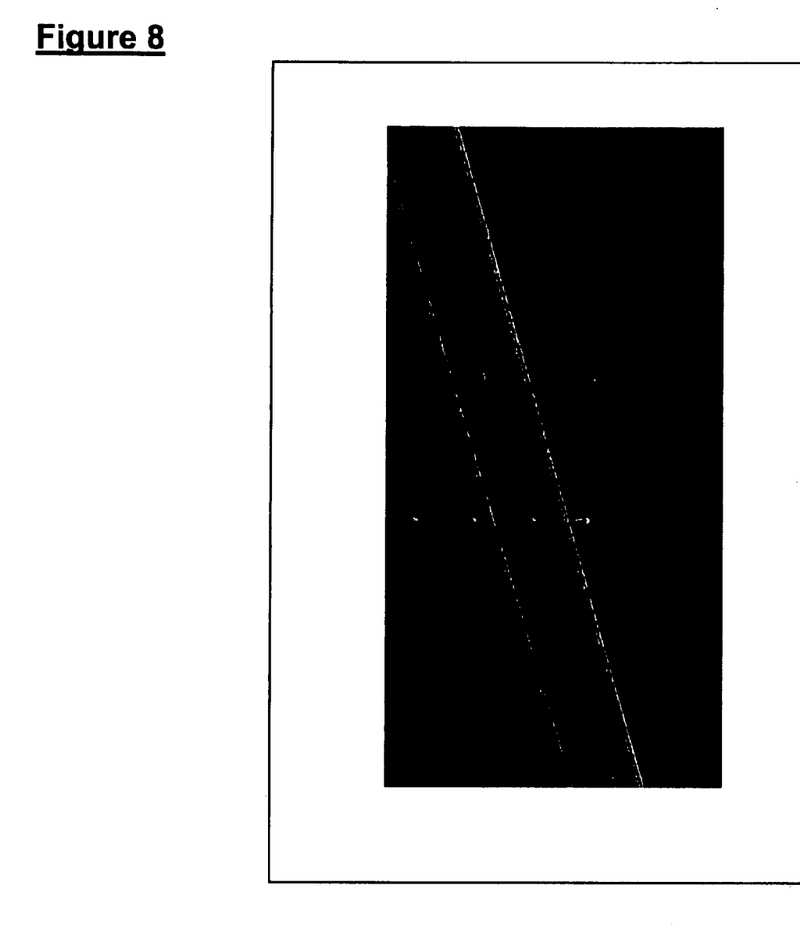
FIG. 8 shows an exemplary paired strongest image lines, according to a preferred embodiment of the present invention.

Next, the N strongest lines are paired, such that lines which have a similar slope are paired together, as illustrated in FIG. 8.

Figure 9:
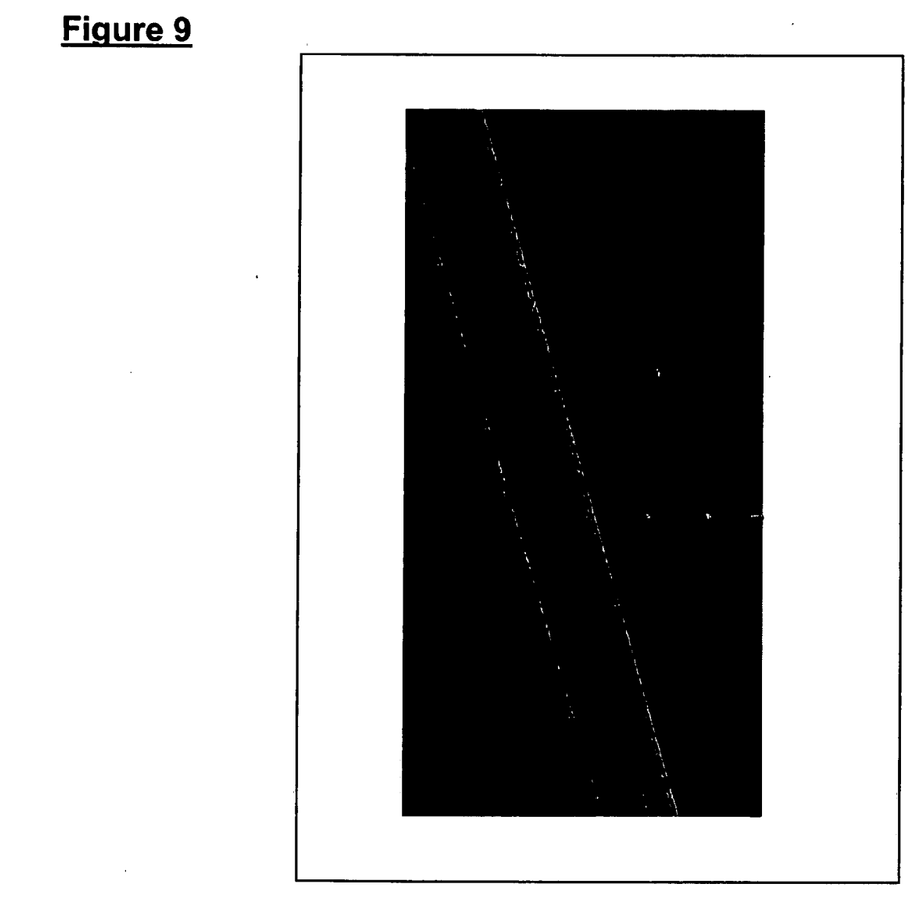
FIG. 9 shows an exemplary image in which the paired strongest lines are reduced to a predetermined number of strongest pairs, according to an embodiment of the present invention.

Next, there are selected 260 a predefined number of strongest line pairs, say according to a user provided parameter indicating the number of line pairs to select among the N strongest lines. Preferably, the number of strongest line pairs selected is two, as illustrated in FIG. 9.

Next, the orientation of the image is determined according to a likely slope of a contour of the object of interest in the image slope. The slope is calculated using the slopes of the strongest lines selected, as described hereinabove.

Optionally, the likely slope of the contour may be calculated by averaging the slopes of one or more of the lines of the strongest among the pairs, by averaging the strongest lines of each of the selected strongest pairs, etc.

After the orientation of the image is determined 270, using either of the criteria described hereinabove, the image is rotated, so as to modify the orientation of the image in accordance with a predefined policy. The predefined policy may be defined by a user, say using the control unit 140, through a user interface managed by the user interface manager 150, as described in further detail hereinabove.

Figure 10:
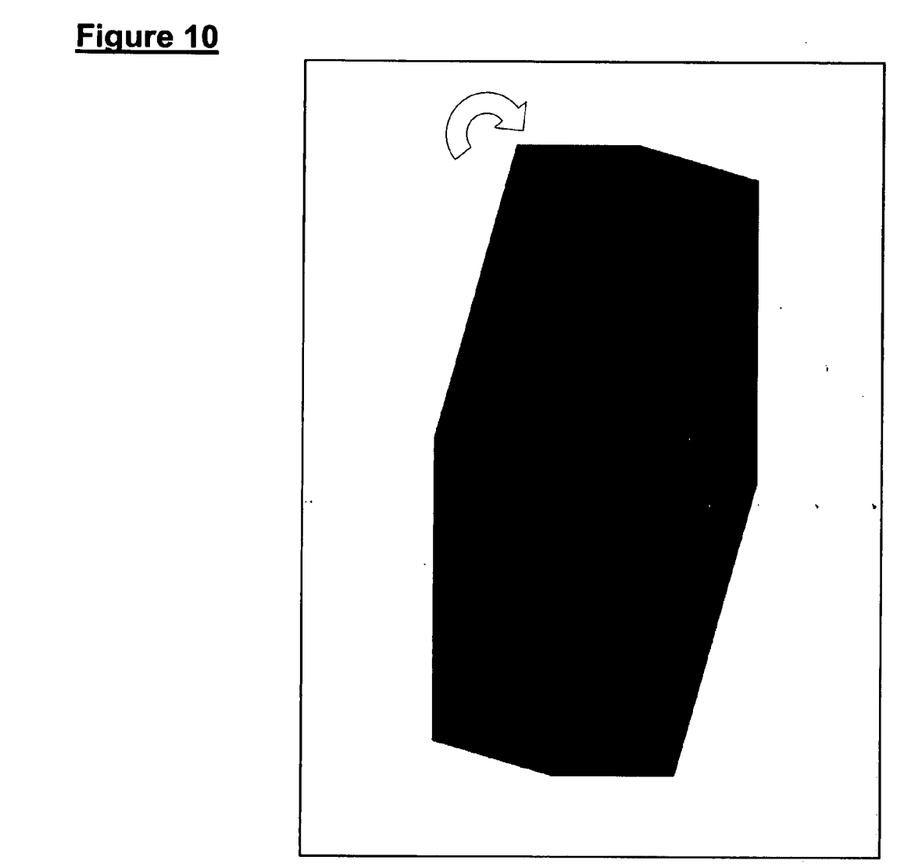
FIG. 10 shows an exemplary rotated image, according to an embodiment of the present invention.

Preferably, the image is rotated to the nearest 90 degrees multiple orientation, or the nearest 180 degrees multiple orientation, as illustrated in FIG. 10.

It is expected that during the life of this patent many relevant devices and systems will be developed and the scope of the terms herein, particularly of the terms "Image", "X-Ray", "Radiographic", "Radiographic Image", "Camera", "Photographic plate", and "Computer", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for determining orientation of a limb within a medical image, the method comprising:
   a) an image receiver, configured to receive the image comprising said limb; and
   b) an orientation determiner, associated with said image receiver and configured to automatically determine an orientation of the limb based on analysis of internal image information, said orientation determiner comprising an edge detector to carry out edge detection to find lines in said image, said orientation determiner further configured to carry out a linear Hough transform on said lines to find at least one strongest line and to determine an inclination of said line, said inclination providing said orientation of said limb.

2. The apparatus of claim 1, wherein said Hough transform provides a plurality of strongest lines, and said orientation determiner is configured to pair substantially parallel edge lines inside the image for said analysis, there from to provide said orientation.

3. The apparatus of claim 1, further comprising an image rotator, associated with said orientation determiner and configured to rotate the image, to reorientate said limb according to a predefined policy.

4. The apparatus of claim 1, further comprising an image rotator, associated with said orientation determiner and configured to rotate the image to reorientate said limb into an orientation being a multiple of ninety degrees.

5. The apparatus of claim 1, further comprising an image down-sizer, associated with said orientation determiner, and configured to downsize the image into a downsized image having a smaller number of pixels than the received image.

6. The apparatus of claim 1, further comprising an image converter, configured to convert said image following edge detection into a binary image, by applying a threshold on intensity of each pixel of said image.

7. The apparatus of claim 6, wherein said threshold is a quotient of intensity of a most intensive pixel of said image and a predefined edge ratio.

8. The apparatus of claim 7, wherein said edge ratio is substantially 7.44.

9. The apparatus of claim 1, further comprising a line detector, associated with said orientation determiner and said edge detector and configured to find lines from detected edges.

10. The apparatus of claim 9, wherein said Hough Linear Transformation is applied to said found lines to identify strongest ones of said found lines.

11. The apparatus of claim 9, further comprising a line pair finder, configured to find pairs of substantially parallel lines amongst said found lines.

12. The apparatus of claim 11, wherein said orientation determiner is further configured to find at least one strongest pair of said found pairs.

13. The apparatus of claim 12, wherein said orientation determiner is further configured to determine the orientation according to an averaged slope of said at least one strongest pair of said pairs.

14. The apparatus of claim 1, further comprising a control unit operable for controlling the apparatus.

15. The apparatus of claim 1, further comprising a user interface manager, configured to manage an interface between the apparatus and a user.

16. Method for determining orientation of a limb in a medical image showing the limb; the method comprising:
   a) receiving the medical image showing the limb;
   b) carrying out edge detection to find lines in said image;
   c) carrying out a Hough transform on said lines to find at least one strongest one of said lines; and
   d) automatically determining an orientation of the limb in the image, based on determination of an orientation of said at least one strongest line.

17. The method of claim 16 further comprising pairing together pairs of said strongest lines which are substantially parallel edge lines inside the image.

18. The method of claim 16, further comprising rotating the image to reorientate the limb according to a predefined policy.

19. The method of claim 16, further comprising rotating the image to reorientate the limb into a ninety degrees multiple orientation.

20. The method of claim 16, wherein said determining comprises downsizing the image into a downsized image having a smaller number of pixels than the received image.

21. The method of claim 20, wherein said detecting of edges is carried out on said downsized image.

22. The method of claim 21, wherein said determining further comprises converting said image following edge detection into a binary image, by applying a predefined threshold on intensity of each pixel of said image following edge detection.

23. The method of claim 22, wherein said threshold is a quotient of intensity of most intensive pixel of said edge detected image and a predefined ratio.

24. The method of claim 23, wherein said predefined ratio is substantially 7.44.

25. The method of claim 22, wherein said finding lines is carried out in said binary image.

26. The method of claim 25, wherein said identifying at least one strongest line using said Hough Linear Transformation is applied on said binary image.

27. The method of claim 26, wherein said determining further comprises determining the orientation of the limb comprises determining a slope of said at least one strongest of said found lines.

28. The method of claim 25, further comprising finding pairs of substantially parallel lines amongst said found lines.

29. The method of claim 28, further comprising finding at least one strongest pair of said found pairs.

30. The method of claim 29, further comprising determining the orientation according to an averaged slope of said at least one strongest pair of said pairs.

* * * * *